(No Model.)

J. PHLEEGAR.
WIRE REEL CARRIER.

No. 486,538. Patented Nov. 22, 1892.

Witnesses

Inventor
Jacob Phleegar.
By his Attorneys,
C. A. Snow & Co.

UNITED STATES PATENT OFFICE.

JACOB PHLEEGAR, OF DE WITT, MISSOURI.

WIRE-REEL CARRIER.

SPECIFICATION forming part of Letters Patent No. 486,538, dated November 22, 1892.

Application filed April 14, 1892. Serial No. 429,154. (No model.)

*To all whom it may concern:*

Be it known that I, JACOB PHLEEGAR, a citizen of the United States, residing at De Witt, in the county of Carroll and State of Missouri, have invented a new and useful Wire-Reel Carrier, of which the following is a specification.

The invention relates to improvements in reel-carriers for winding and stretching fence-wires.

The object of the present invention is to provide a simple and comparatively-inexpensive reel-carrier capable of being readily employed for stretching fence-wires and adapted to rewind wire evenly on the spool.

The invention consists in the construction and novel combination and arrangement of parts hereinafter fully described, illustrated in the accompanying drawings, and pointed out in the claim hereto appended.

Figure 1:
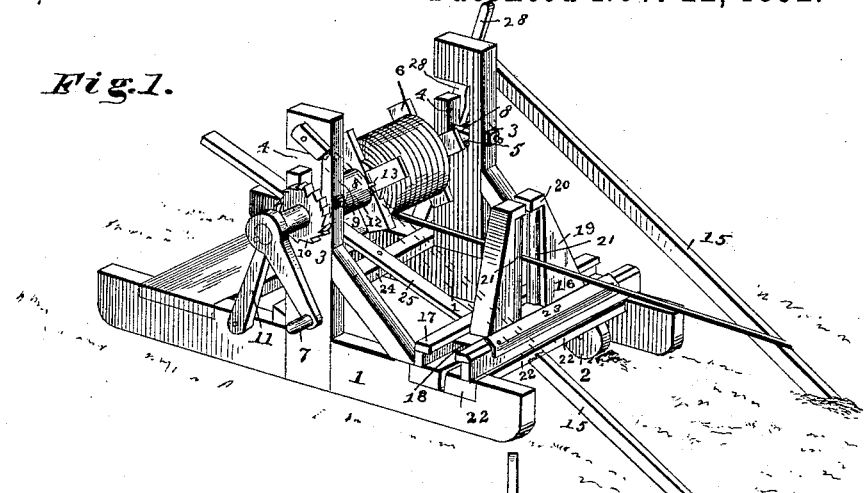
Figure 2:
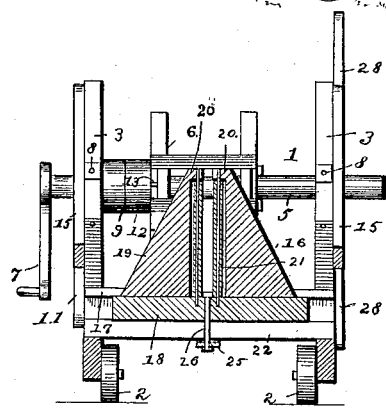
Figure 3:
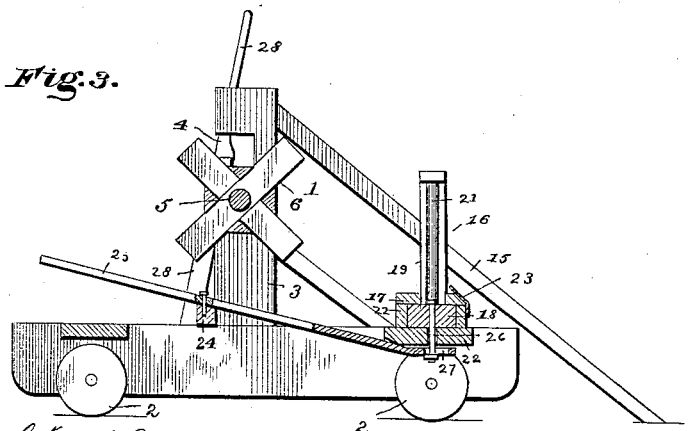

In the drawings, Figure 1 is a perspective view of a reel-carrier constructed in accordance with this invention. Fig. 2 is a transverse sectional view. Fig. 3 is a longitudinal sectional view.

Like numerals of reference indicate corresponding parts in all the figures of the drawings.

1 designates a frame mounted on wheels 2 and provided with standards 3, in bearing-slots 4 of which is journaled a spool-shaft 5, carrying a spool 6 and adapted to be rotated by a crank-handle 7, arranged at one end of it. The bearing-slots 4 are L-shaped, and the spool-shaft, which is removably journaled in them, is secured from accidental displacement by pins 8. The shaft is held against longitudinal movement by a collar 9, arranged adjacent to the inner face of one of the standards, and a ratchet-wheel 10, arranged on the outer face of that standard, and the collar and the ratchet-wheel are rigidly secured to the shaft, the ratchet-wheel being engaged by a pawl 11 to prevent the shaft reversely rotating and loosening the wire when the reel-carrier is employed as a wire-stretcher.

The spool 6 is held rigid with the shaft by means of a clutch 12 and a pin 13, which holds the spool in engagement with the arms of the clutch. The clutch is composed of a disk rigidly secured to the shaft and the said arms, which project from diametrically-opposite points, and are adapted to receive between them one of the end bars of the spool.

When the reel-carrier is employed for stretching wire, it is held rigid by inclined braces 15, having their upper ends pivoted to the tops of the standards and their lower ends adapted to be inserted into the ground.

In rewinding wire on a spool the wire is delivered evenly to the spool by a sliding guide 16, moving across the reel-carrier in front of the spool. This sliding guide is arranged in ways 17 and is composed of a bottom plate 18 and vertical triangular pieces 19, secured to the plate 18 and provided at their tops with inwardly-extending lugs 20 and having journaled between the lugs and the bottom plate 18 rollers 21, which are vertically disposed and are arranged parallel with each other, and are designed to enable the wire to pass freely through the opening of the guide. The lugs are separated by a short space, which forms a mouth to the opening by which the wire may be engaged in the guide. The ways 17 are formed by cleats secured to the upper face of a cross-bar 22, and the outer one has secured to its upper edge an inclined plate 23, which has its outer edge bent downward on the cleat and which forms a smooth surface for the wire passing over the cleat. The slide is actuated by a lever 25, fulcrumed between its ends on a transverse bar 24 and having its lower end connected with the plate 18 of the slide by a stem or rod 26, which is arranged in a slot of the cross-bar. The upper end of the lever is shaped into a handle, and by oscillating the lever the slide is reciprocated in the ways 17, thereby distributing the wire evenly over the spool.

The speed of the spool-shaft in unwinding wire is regulated by a lever 28, which has its lower end fulcrumed on one of the side bars of the frame and which is adapted to bear against the shaft and serve to retard the motion of the same.

The wire is delivered from the guide to the bottom of the spool and is wound thereon, thereby keeping the wire in an approximately-horizontal line and within the guide. The stem which connects the guides with the lower end of the lever is arranged in a slot 27 of the latter.

The device is adapted to increase the tension or take up the slack of fence-wires. The fence-wire to be tightened is connected with the shaft and is drawn to the desired tension and is then secured by stapling or the like in the usual manner.

What I claim is—

The combination of a frame having vertical standards rising from its sides and provided with a horizontal cross-bar 24, connecting the sides and arranged near the lower ends of the standards, the transverse ways arranged at the front of the frame and provided in their bottom with a longitudinal slot, a sliding wire-guide mounted for transverse movement in the ways and having a vertical wire-receiving opening, a longitudinally-disposed oscillating lever fulcrumed between its ends on the cross-bar 24 and having its front ends arranged beneath the ways and pivotally connected with said guide by a pin passing through the slot in the bottom of the ways, said lever extending to the rear of the frame, and a fixedly-supported spool-shaft journaled in the standards, substantially as described.

In testimony that I claim the foregoing as my own I have hereto affixed my signature in the presence of two witnesses.

JACOB PHLEEGAR.

Witnesses:
E. E. ETTLE,
JAS. E. GRINNELL.